(12) United States Patent
Quail et al.

(10) Patent No.: US 9,033,710 B2
(45) Date of Patent: May 19, 2015

(54) TARGET DEVICE FOR DETERMINING RECEIVED HITS IN A LIGHT BASED WEAPONS SIMULATION SYSTEM

(71) Applicants: Jeffrey James Quail, Winnipeg (CA); Rory Bochinski, Winnipeg (CA); Alex McIlraith, Winnipeg (CA); Luke Draper, Sugar Land, TX (US); Fred Swensen, Sugar Land, TX (US)

(72) Inventors: Jeffrey James Quail, Winnipeg (CA); Rory Bochinski, Winnipeg (CA); Alex McIlraith, Winnipeg (CA); Luke Draper, Sugar Land, TX (US); Fred Swensen, Sugar Land, TX (US)

(73) Assignee: Stress Vest Inc, Winnipeg, Manitoba (CA)

( * ) Notice: Subject to any disclaimer, the term of this patent is extended or adjusted under 35 U.S.C. 154(b) by 68 days.

(21) Appl. No.: 13/731,765

(22) Filed: Dec. 31, 2012

(65) Prior Publication Data

US 2014/0186802 A1 Jul. 3, 2014

(51) Int. Cl.
*F41G 3/26* (2006.01)
*F41A 33/00* (2006.01)
*F41J 5/02* (2006.01)

(52) U.S. Cl.
CPC ... *F41A 33/00* (2013.01); *F41J 5/02* (2013.01)

(58) Field of Classification Search
CPC ......... F41A 33/00; F41A 33/02; F41A 33/06; F41G 3/16; F41G 3/26
USPC ...................................................... 434/11–26
See application file for complete search history.

(56) References Cited

U.S. PATENT DOCUMENTS

| 3,898,747 | A | * | 8/1975 | Marshall | 434/22 |
| 5,788,500 | A | * | 8/1998 | Gerber | 434/22 |
| 6,863,532 | B1 | * | 3/2005 | Ambrosoli | 434/11 |
| 7,872,849 | B2 | * | 1/2011 | Elliott, Jr. | 361/232 |

* cited by examiner

*Primary Examiner* — Timothy A Musselman
(74) *Attorney, Agent, or Firm* — Ryan W. Dupuis; Kyle R. Satterthwaite; Ade & Company Inc (57) ABSTRACT

A target device is usable with a simulation system which includes a weapon simulator having a trigger, a chamber for firing a blank cartridge in response to the trigger, and a transmitter arranged to emit a light signal defining one or more activation codes of prescribed duration in response to the trigger. The target device includes a sensor array of photodiodes and a processor receiving output signals from the photodiodes. The processor determines that the sensor array has been hit by the weapon simulator in response to a first portion of one activation code being received by one of the photodiodes and at least one second portion of the same activation code being received by the same or a different one of the photodiodes when the first portion and the at least one second portion correspond to an entirety of one activation code within the respective prescribed duration.

11 Claims, 7 Drawing Sheets

Fig. 10 – Directivity

TARGET DEVICE FOR DETERMINING RECEIVED HITS IN A LIGHT BASED WEAPONS SIMULATION SYSTEM

FIELD OF THE INVENTION

The present invention relates to a target device arranged to be worn by a user in a weapon simulation system including a simulated weapon arranged to emit a light signal in which the target device is arranged to determine that the user has been hit by the simulated weapon when the light signal is received.

BACKGROUND

Various types of combat simulation systems are known for training soldiers and law enforcement officers. For example U.S. Pat. No. 4,487,583 by Brucker et al. discloses a weapons engagement simulation system in which a pulsed beam is generated from a simulated weapon which also incorporates the ability to fire blank charges. Users also wear a vest supporting an array of photodiodes thereon which are arranged to sense the light beam from the weapon directed upon the sensors. A hit is determined only if any single sensor receives an entire activation code within the pulsed beam. As shown in FIG. 7 of Brucker, hits are determined by individual hit detectors 66 which are each coupled to only one respective photodiode. To minimize interference from ambient light signals received upon the photodiodes which might represent erroneous hit signals, the pulsed beam must have a sufficient duration to define a sufficiently long and complex activation code. In the example by Brucker, several pulses with a two millisecond spacing are required to define an activation code which defines a hit signal. When firing a blank round together with a light beam being transmitted from the simulated weapon however, the recoil of the weapon from the blank round typically results in the light beam not being focussed on any single diode for a sufficient duration for the diode to receive the entirety of the activation code.

Another weapon engagement simulation system is disclosed in U.S. Pat. No. 7,872,849 by Elliott Jr. This system similarly comprises simulated weapons which generate light beams arranged to be detected by sensors on vests worn by the users. The sensors in this instance however comprise solar cells. When incorporating the firing of blank rounds together with a light beam emitting from the simulated weapon, the resulting recoil can cause the light beam to be displaced across the solar cells in a manner which results in the magnitude of light received at any one area of the solar cell being too weak to record a hit.

In other light based weapons engagement simulation systems, the recoil effect is compensated for by transmitting light in a cone shaped beam so that slight variations in the aiming of the simulated weapon resulting from recoil still maintains sufficient light at a single prescribed sensor for sufficient duration to activate a hit signal. The large cone shape required can result in determination of hits being received even when the actual centre of the cone representing the target location of the simulated weapon is offset and misaligned with the target sensors. Furthermore, the cone beam typically activates a large number of sensors such that subsequent pinpointing of the actual target location is difficult or impossible.

SUMMARY OF THE INVENTION

According to one aspect of the invention there is provided a target device for use in a weapons simulation system including a weapon simulator having a trigger, a firing chamber arranged for firing a blank cartridge responsive to actuation of the trigger, and a transmitter arranged to emit a light signal responsive to actuation of the trigger, the light signal comprising a beam of pulsed light defining one or more activation codes, each of prescribed duration, the target device comprising:

a sensor array comprising a plurality of photodiodes arranged to generate respective output signals responsive to light received thereon;

a processor associated with the sensor array so as to be arranged to receive the output signals from the photodiodes of the sensor array;

the processor being arranged to determine that the sensor array has been hit by the weapon simulator in response to a first portion of one activation code being received by one of the photodiodes and at least one second portion of said activation code being received by the same or a different one of the photodiodes in which the first portion and said at least one second portion correspond to an entirety of one activation code and in which the first portion and said at least one second portion are received within the respective prescribed duration; and an output arranged to output a hit signal in response to determination by the processor that the sensor array has been hit by the weapon simulator.

In this instance, even if a light signal is projected across multiple sensors within a sensor array, for example as a result of the weapon recoiling from the simultaneous firing of a blank cartridge, monitoring of the output of all of the sensors within the array by a common processor allows a hit signal to be detected even if the light signal does not remain focussed on a single sensor. Accordingly, a precise light beam can still be used for ensuring hits are only determined if the weapon is clearly aligned with the actual target. Furthermore, the specific target location can be determined and recorded for scoring or other purposes if desired.

Preferably there is provided at least one filter layer spanning over the sensor array so as to be arranged to prevent at least some undesirable light from reaching the photodiodes and at least one attenuation layer spanning over the sensor array in which said at least one attenuation layer is arranged to attenuate any light directed at the photodiodes.

The target device may further include a striking surface spanning over the sensor array which may be part of the filter layer, the attenuator layer or a separate focal plane layer. In either instance, each photodiode is preferably supported at a prescribed focal length from the striking surface such that a focal plane of the photodiode at the striking surface has a prescribed focal width and such that each photodiode is spaced apart from other diodes corresponding to a distance between centers of the photodiodes which is less than the prescribed focal width.

When there is a plurality of target devices of like configuration, preferably each target device includes a carrier body upon which the respective sensor array, the respective processor and the respective output are supported in which the carrier body is arranged to be supported on a respective body portion of a user.

Preferably a hub is in communication with the output of each target device which includes a transmitter so as to be arranged to transmit a hit signal received from any one of the target devices.

The transmitter may be a radio frequency transmitter such that the hit signal transmitted therefrom comprises a radio frequency signal.

Preferably the hub is arranged to associate a target device identification of a respective one of the target devices with each hit signal received from the target devices and transmit the target device identification with the hit signal.

The target device is well suited for use with an electrical shocking device which is arranged to communicate with the hub and deliver an electrical shock to a user in response to a hit signal being received from the hub.

The sensor array may include at least one reflective sensor supported on a carrier body in which the carrier body is arranged to be supported on a user such that said at least one reflective sensor is oriented to capture light signal reflected off of the user.

According to another aspect of the present invention there is provided a target device for use in a weapons simulation system including a weapon simulator having a trigger and a transmitter arranged to emit a light signal responsive to actuation of the trigger, the light signal comprising a beam of pulsed light defining one or more activation codes, each of prescribed duration, the target device comprising:

a sensor array comprising a plurality of photodiodes arranged to generate respective output signals responsive to light received thereon;

a processor associated with the sensor array so as to be arranged to receive the output signals from the photodiodes of the sensor array;

the processor being arranged to determine that the sensor array has been hit by the weapon simulator in response to one activation code being received collectively by the photodiodes within the respective prescribed duration;

an output arranged to output a hit signal in response to determination by the processor that the sensor array has been hit by the weapon simulator; and at least one carrier body arranged to support the photodiodes of the sensor array on a user;

the sensor array comprising at least one reflective sensor supported on said at least one carrier body such that said at least one reflective sensor is oriented to capture light signal reflected off of the user.

The carrier body preferably include a projecting portion arranged to project outwardly from a respective surface portion of the user so as to be oriented transversely to the surface portion of the user in which said at least one reflective sensor is supported on the projecting portion so as to be arranged to capture light signals reflected off of the surface portion of the user.

The projecting portion may be supported on the carrier body so as to be arranged to face downwardly when supported on the user.

The carrier body upon which said at least one reflective sensor is supported is preferably arranged to be supported on a head of the user such that the projecting portion upon which said at least one reflective sensor is supported comprises a downward facing bottom side of a visor projecting outwardly above a face area of the user.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures, there is illustrated a light based weapon simulation system generally indicated by reference numeral 10. The system 10 is intended to be used with a plurality of users in which each user is provided with a weapon simulator 12 and a receiver system 14.

The weapon simulator 12 is generally in the form of a handgun and is used to simulate weapon strikes against other users. The weapon simulator includes a handgun-shaped body carried in the hand of the user and a trigger 16 supported thereon for activation by the user. The weapon simulator further includes a firing chamber 18 arranged to receive a blank cartridge therein and fire the cartridge responsive to actuation of the trigger. A primary transmitter 20 is also provided for emitting a light signal responsive to actuation of the trigger. The light signal generally takes the form of a straight and focused laser beam comprising pulsed light which defines one or more activation codes within a sequence in which each activation code comprises several pulses over a respective prescribed duration of time. The light may comprise visible red light, visible green light, infrared light, or any other light within the visible or non-visible spectrums.

Figure 8:
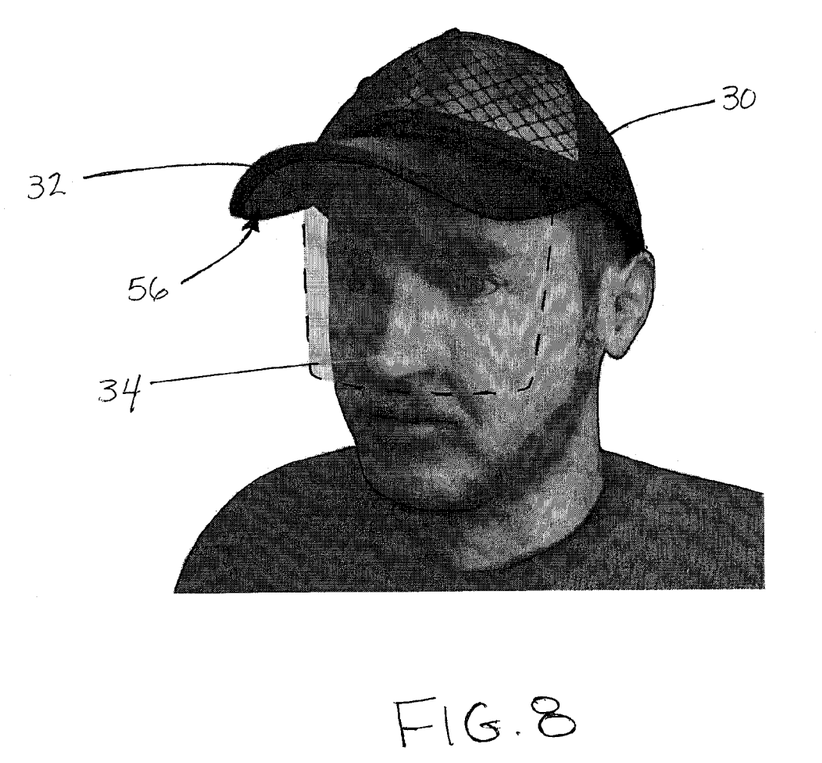
FIG. 8 is a perspective view of the target device worn on the head of a user with a target area shown highlighted on the face of the user from which reflected light signals can be sensed.

The receiver system worn by each user generally includes a plurality of separate target devices of like configuration. Each target device includes a carrier body arranged for carrying the respective body device on a respective body portion of the user. The target devices include a front panel 24 supported on the chest of the user, a rear panel 26, supported on the back of the user, two side panels 28 arranged to be supported along respective sides of the torso of the user and a cap 30 arranged to be supported on the head of the user. The cap 30 further includes a visor 32 defining a projecting portion of that target device which projects outwardly above the face of the user. The visor is accordingly oriented transverse to the face of the user so as to be suitably oriented to receive light signals reflected off of the target area 34 on the face of the user as shown in FIG. 8.

More particularly, each target device includes a backing panel 36 joined to the carrier body for being supported against the body of a user. A sensor array 38 is provided in the form of an evenly spaced grid of photodiode sensors 39 at a prescribed spacing from one another. The photodiode sensors 39 are each arranged to generate a respective output signal in response to light received thereon.

Each target device also includes a layer of diffusing material 40 spanning over the sensor array 38 to define the striking surface "S". In the preferred embodiment, the diffuser layer comprises a sheet of Coroplast™ of uniform thickness.

Figure 9:
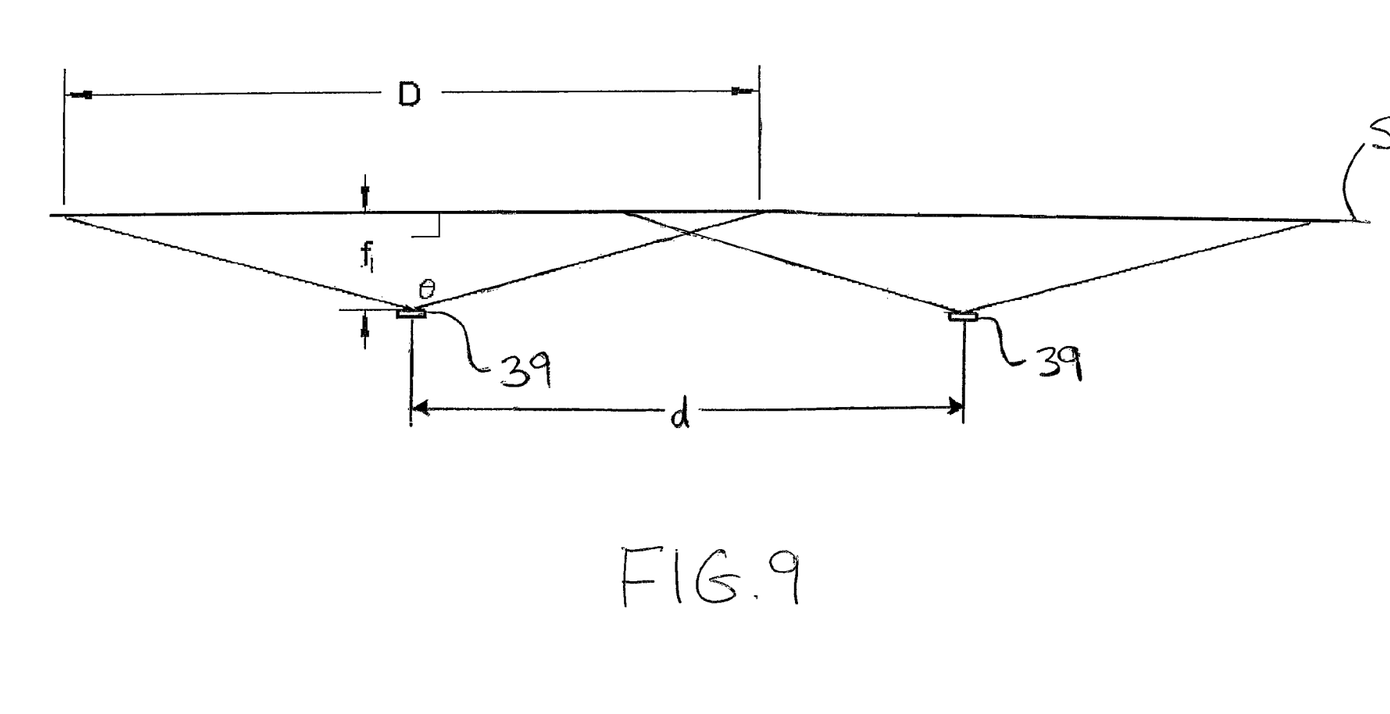
FIG. 9 is a schematic representation of the placement of one of the photodiodes in relation to the striking surface.
Figure 10:
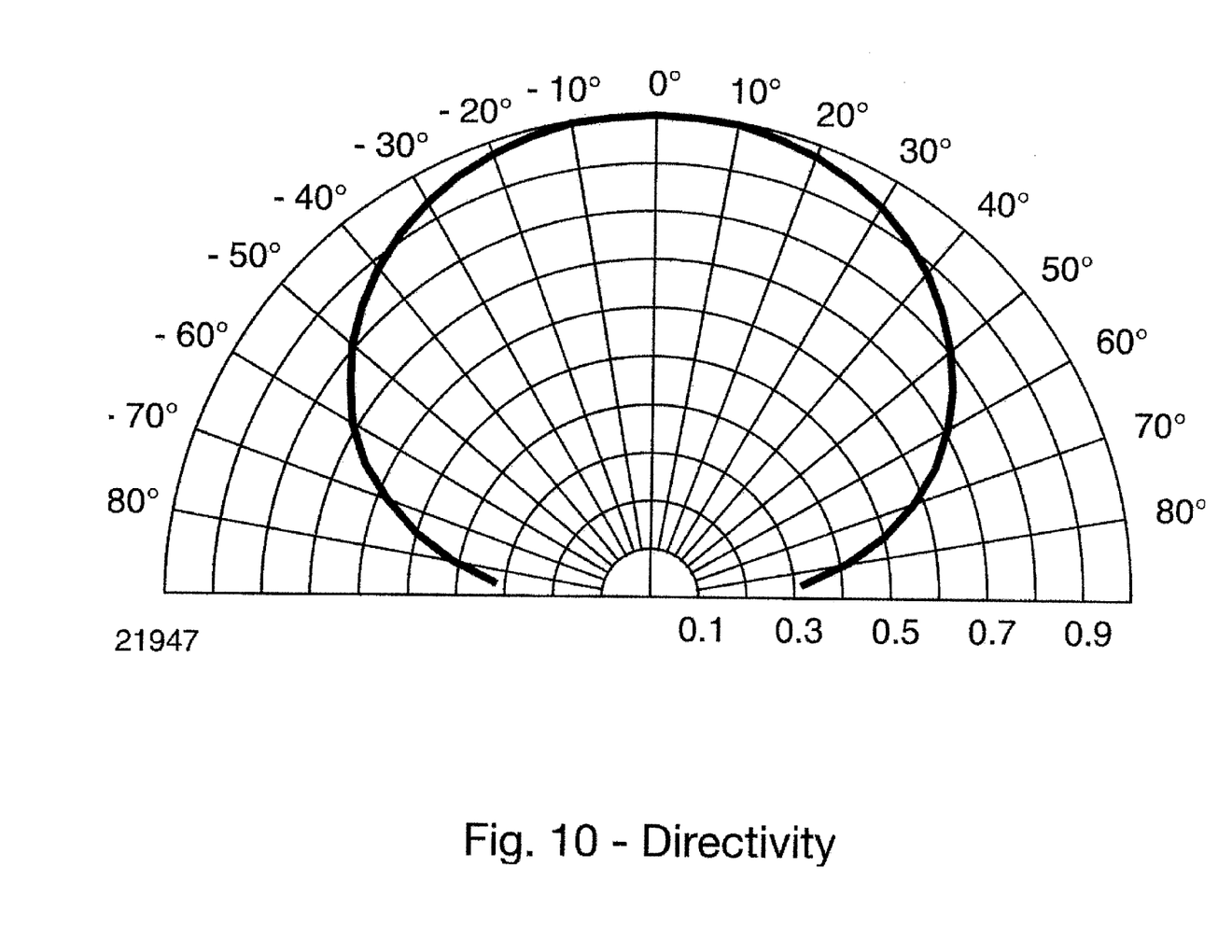
FIG. 10 is a schematic representation of the directivity of the photodiodes.

More particularly, each photodiode has respective directivity characteristics as represented in FIG. 10 which defines a width of the focal plane of the photodiode at different focal lengths between the focal plane and the photodiode. As shown in FIG. 9, each photodiode 39 is supported at a prescribed focal length "$f_1$" from the striking surface "S" that spans over the sensor array parallel to the backing panel 36 and that the lasers are directed. The prescribed focal length defining the distance that the photodiodes are spaced from the striking surface is uniform among all photodiodes. The resulting focal plane of each photodiode at the striking surface "S" has a prescribed focal width "D". Each photodiode is spaced apart from other diodes such that a distance "d" between centers of the photodiodes is less than the prescribed focal width "D" to ensure that all points on the striking surface is within the focal plane of at least one photodiode.

The laser beam in free space is not detectable by the sensor. For the laser beam (or signal) to be detected it must strike a surface visible to the sensor. The use of coroplast is added in front of the sensors to provide this surface. The front surface of the coroplast is the Focal Plane for the sensors.

The sensors are forward looking and can detect the signal in a cone shaped region that is referred to as Directivity in the characteristics of the sensor. The Directivity is the angle of the cone the sensor can detect the signal. When the laser beam strikes the coroplast it can be detected by the sensor as long as it is within the sensors detection cone. The greater the distance the sensor is located from the focal plane the larger the diameter of the cone at the focal plane.

To be able to space the sensors at an acceptable distance between centers, the focal plane needs to be extended in front of the face of the sensor (Focal Distance). The chosen Focal Distance is primarily controlled by the physical limitations of the acceptable panel thickness and available materials.

The chosen material is 4 mm thick Coroplast. At a Focal Distance of 4 mm the sensor spacing can be calculated to 30 mm on centers. A distance of 25.5 mm on center was chosen to evenly space the sensors on the panels and provide a reasonable engineering margin.

Each target device further includes an outer filter layer 42 spanning across the sensor array for filtering the light therethrough to prevent at least some undesirable parts of the light spectrum from reaching the photodiode sensors. The filters are designed to reduce the ambient light noise without reducing the coded laser signal.

An attenuator layer 44 also spans the sensor array at a location between the diffuser layer 40 and the outer filter layer 42. The attenuator layer 44 may provide some diffusing function, but primarily attenuates any light directed at the photodiodes such that the attenuator layer attenuates both ambient light and other light noise as well as somewhat attenuating the coded laser signal.

Each target device includes a processor associated with all of the diodes of that array. The processor receives and monitors all of the output signals from the respective diodes and is arranged to determine that the target device has been hit by the weapon simulator if certain conditions are met. In particular, various portions of any one activation code of the light signal can impact the one or plural of the photodiodes respectively within the prescribed duration of the activation code to determine a hit. For example if a first portion of one activation code is received by one photodiode and one or more additional portions of the same activation code are received by either the same or different respective ones of the photodiodes, the determination of a hit can still be made as long as the first portion of the activation code and the one or more additional portions collectively correspond to the entirety of one activation code and all of the respective portions of the code are received within the respective prescribed duration for the activation code in relation to one another.

Each target device include an output 48 associated therewith for outputting the hit signal in response to determination by the processor that the respective sensor array has been hit by the weapon simulator.

The receiver system further includes a hub 50 in communication with all of the outputs 48 of the various target devices for receiving all of the hit signals. The hub 50 is further arranged to identify each target device and associate the respective target device identification with each hit signal being received.

A transmitter 52 is coupled to the hub 50 for transmitting all of the hit signals received by the hub along with the target device identification associated therewith to an auxiliary device. The auxiliary device may take various forms, for example a controller for recording hits for scoring purposes.

In the illustrated embodiment, the auxiliary device comprises an electrical shock generating device 54 worn as a belt about the waist of the user. The device 54 includes a suitable receiver for receiving the hit signal transmitted by the transmitter 52 coupled to the hub 50 of the receiver system. The shock device 54 is in turn arranged to deliver an electrical shock to the user according to various criteria prescribed by a controller of the shock device. A suitable controller and shock device are described in co-pending U.S. patent application Ser. No. 13/314,833 and Canadian application 2,778,941, the disclosures of which are incorporated herein by reference.

The transmitter 52 may comprise an RF transmitter such that the hit signal transmitted therefrom is a radio frequency signal arranged to be received by an RF receiver on the controller of the shock device. Alternatively the transmitter 52 may include a hard wired connection to the controller of the shock device such that the hit signal is transmitted in electrical form by the hardwire connection.

Figure 1:
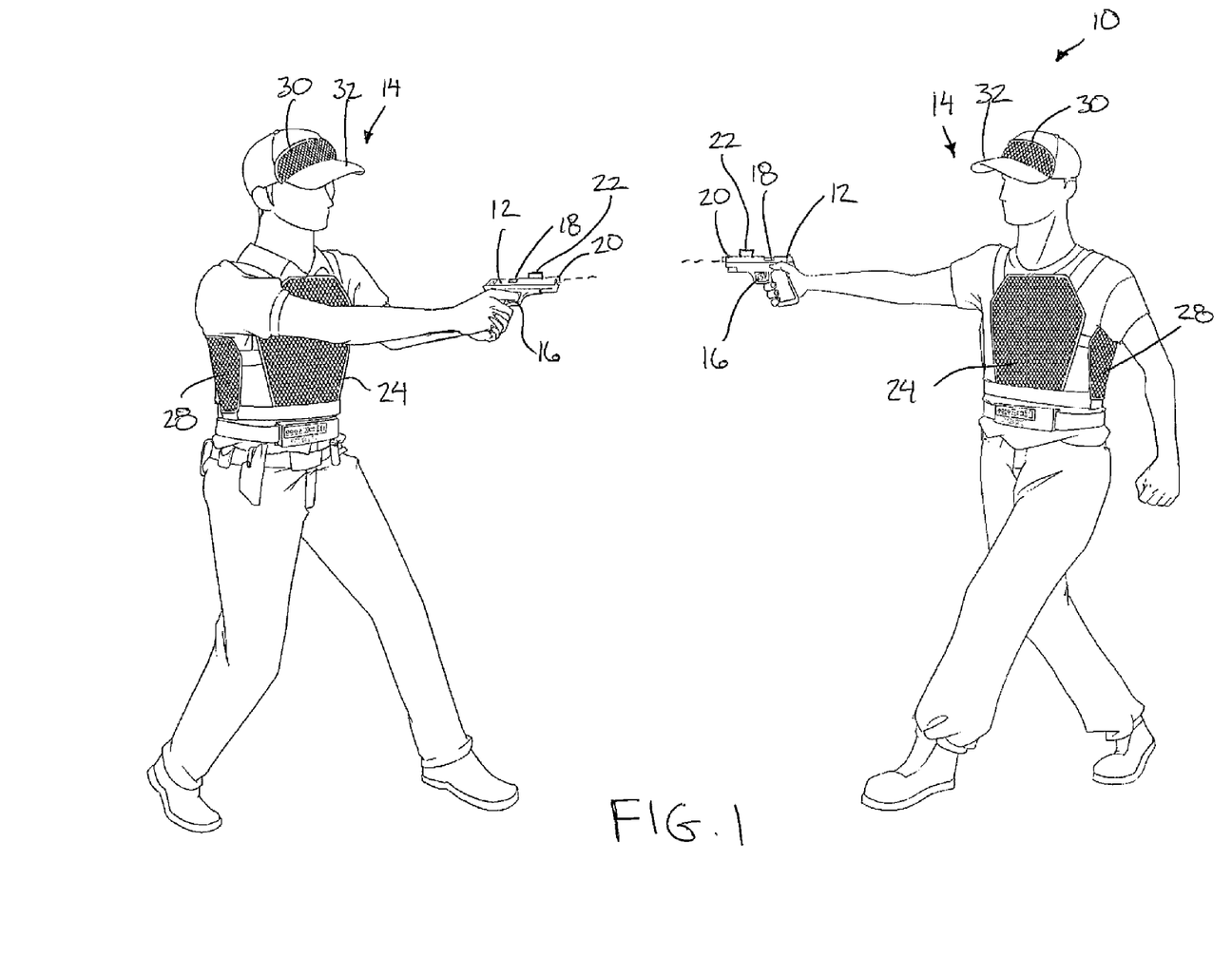
FIG. 1 is a perspective view of the weapon simulation system of the present invention applied to two users.
Figure 2:
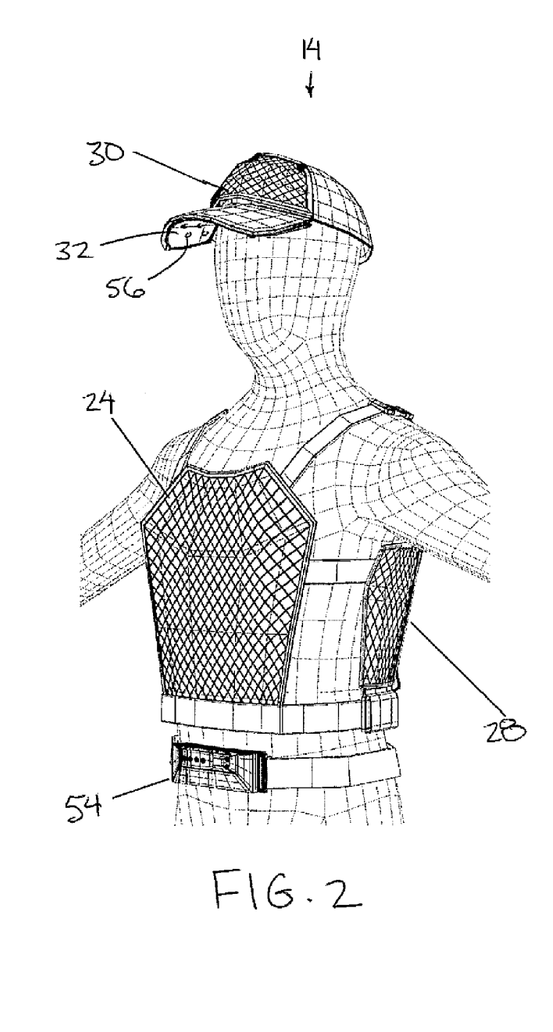
FIG. 2 is a front perspective view of the receiver system worn by one user.
Figure 3:
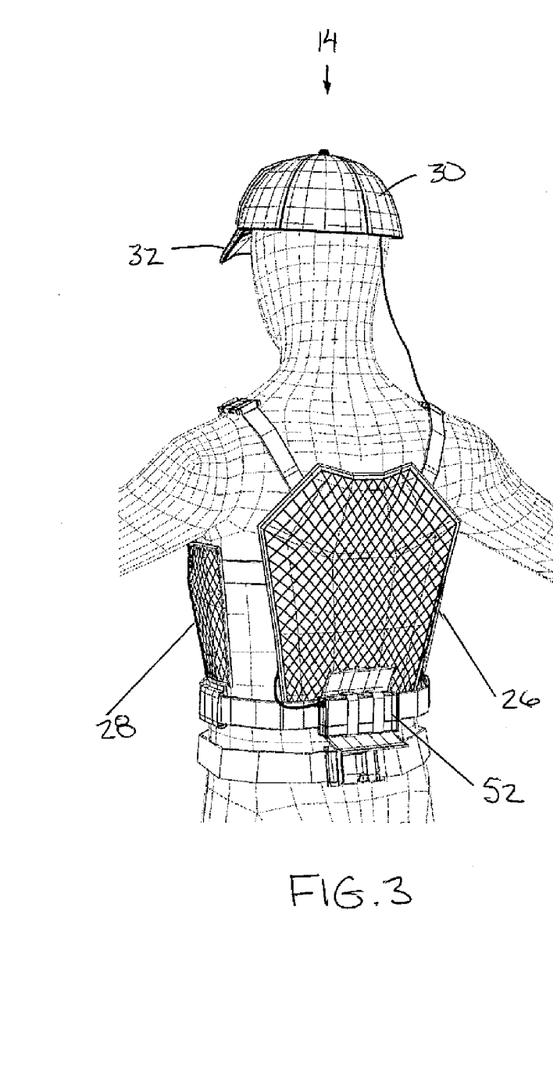
FIG. 3 is a rear perspective view of the receiver system worn by one user.
Figure 4:
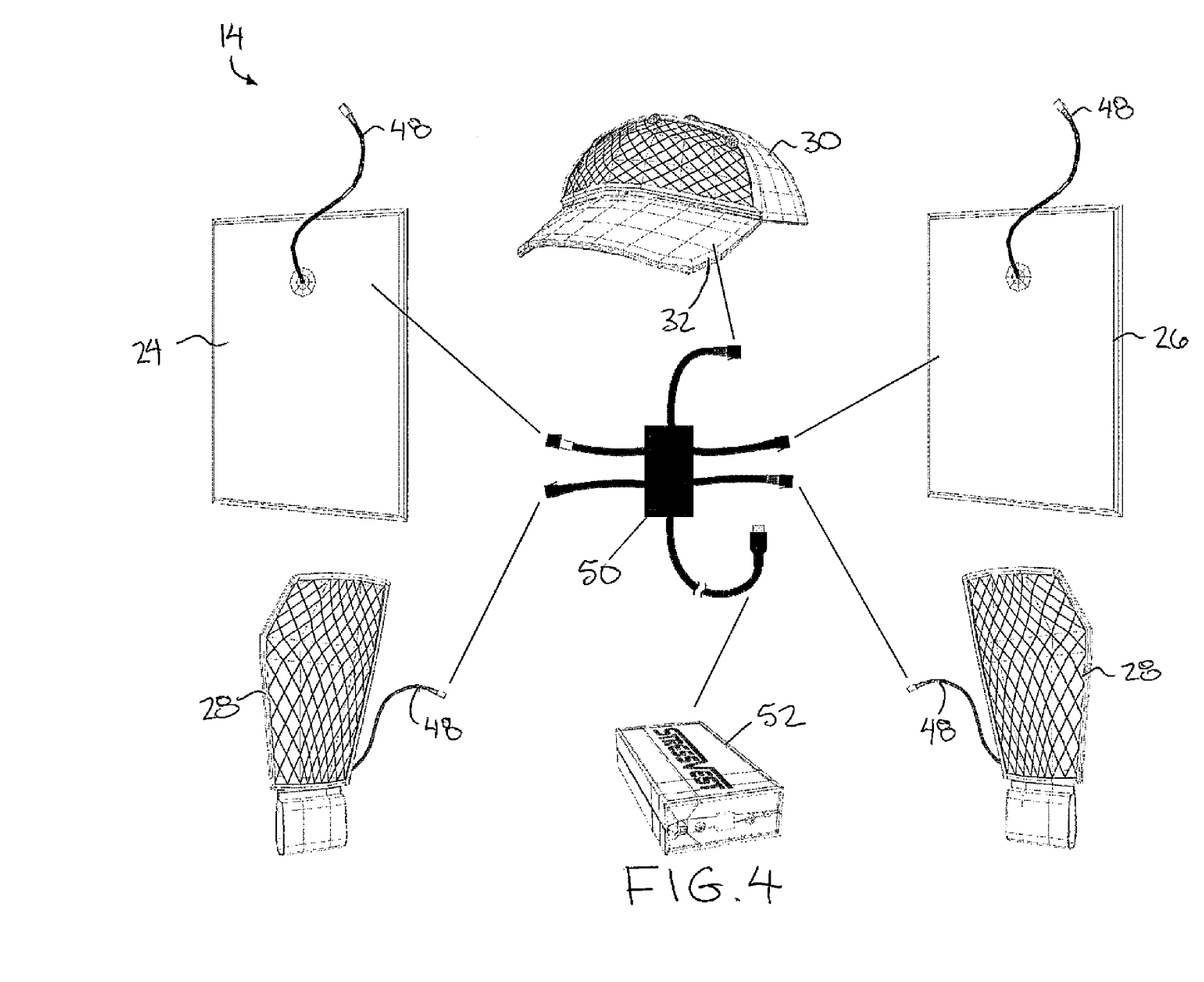
FIG. 4 is an exploded schematic representation of the components of the receiver system for one user.
Figure 5:
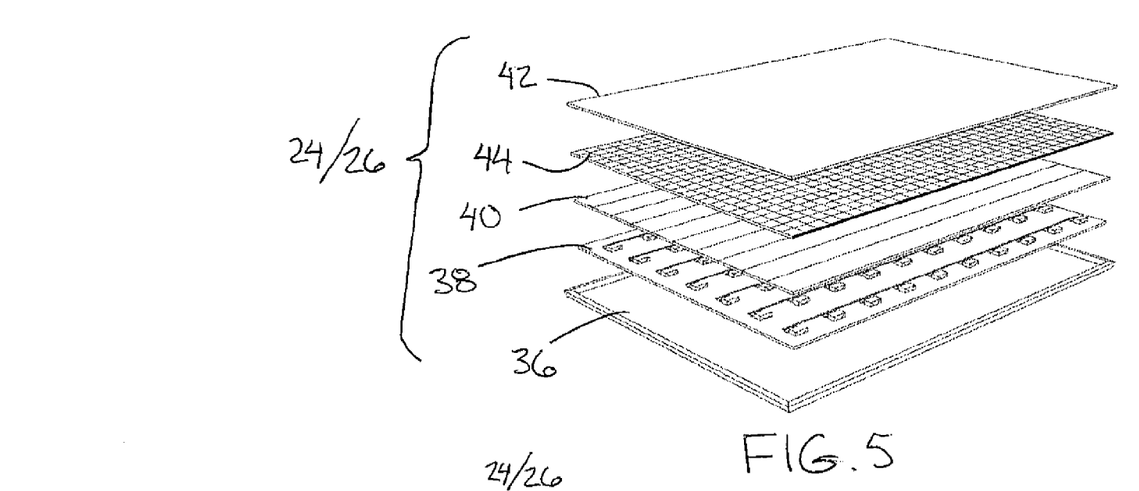
FIG. 5 is an exploded perspective view of one of the target devices which form part of the receiver system for one user.
Figure 6:
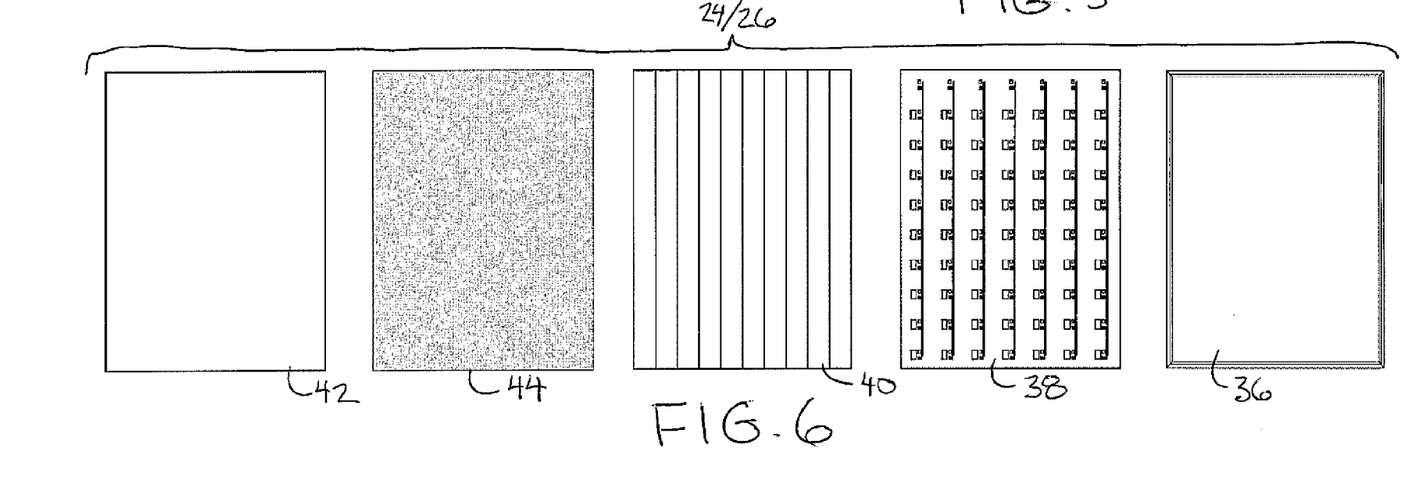
FIG. 6 is a plan view of the components of the target device of FIG. 5 shown separated from one another.
Figure 7:
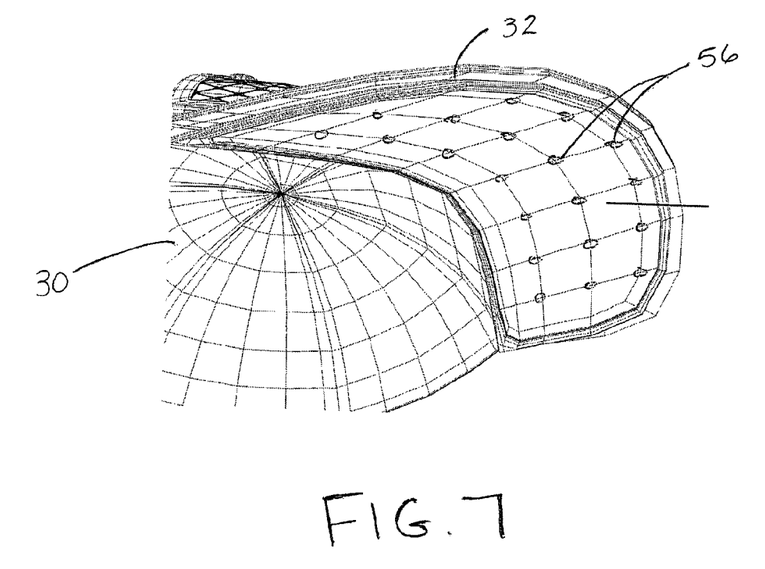
FIG. 7 is a perspective view of an underside of the visor portion of the target device to be worn on the head of a user.

Some of the photodiodes may take the form of reflective sensors which are supported on the respective carrier body so as to be arranged to be supported on a user such that the reflective sensors are oriented to capture light signals which are reflected off of a user. In the illustrated embodiment, the reflective sensors 56 are supported on the downward facing bottom side of the visor 32 of the target device in the form of a cap 30 supported on the head of the user. The reflective sensors are thus supported on a surface oriented transversely to the face of the user so that light reflected off of the target area 34 on the face of the user is reflected onto one or more of the reflective sensors 56 which are spaced apart in a grid on the downward facing sensing surface of the visor. The reflective sensors do not require the same degree of filtering or diffusion provided by auxiliary layers supported thereacross as in the other photodiodes on the other target devices due to the reflected light already comprising a beam diffused over a much larger area. Furthermore, the downward facing orientation of the sensing surface on the underside of the visor is less likely to receive erroneous light signals directed thereon from ambient lighting conditions.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A target device for use in a weapons simulation system including a weapon simulator having a trigger, a firing chamber arranged for firing a blank cartridge responsive to actuation of the trigger, and a transmitter arranged to emit a light signal responsive to actuation of the trigger, the light signal comprising a beam of pulsed light defining one or more activation codes, each of prescribed duration, the target device comprising:

a sensor array comprising a plurality of photodiodes arranged to generate respective output signals responsive to light received thereon;

a processor associated with the sensor array so as to be arranged to receive the output signals from the photodiodes of the sensor array;

the processor being arranged to determine that the sensor array has been hit by the weapon simulator in response to a first portion of one activation code being received by one of the photodiodes and at least one second portion of said activation code being received by different one of the photodiodes in which the first portion and said at least one second portion correspond to an entirety of one activation code and in which the first portion and said at least one second portion are received within the respective prescribed duration; and     an output arranged to output a hit signal in response to determination by the processor that the sensor array has been hit by the weapon simulator.

2. The target device according to claim 1 further comprising at least one filter layer spanning over the sensor array so as to be arranged to prevent at least some undesirable light from reaching the photodiodes.

3. The target device according to claim 1 further comprising at least one attenuation layer spanning over the sensor array in which said at least one attenuation layer is arranged to attenuate any light directed at the photodiodes.

4. The target device according to claim 1 further comprising a striking surface spanning over the sensor array, each photodiode being supported at a prescribed focal length from the striking surface such that a focal plane of the photodiode at the striking surface has a prescribed focal width, and each photodiode being spaced apart from other diodes such that a distance between centers of the photodiodes is less than the prescribed focal width.

5. The target device according to claim 1 in combination with a plurality of other target devices of like configuration, each target device including a carrier body upon which the respective sensor array, the respective processor and the respective output are supported, the carrier body being arranged to be supported on a respective body portion of a user.

6. The target device according to claim 5 in further combination with a hub in communication with the output of each target device and including a transmitter so as to be arranged to transmit a hit signal received from any one of the target devices.

7. The target device according to claim 6 in further combination with an electrical shocking device arranged to communicate with the hub and deliver an electrical shock to a user in response to a hit signal being received from the hub.

8. The target device according to claim 6 wherein the transmitter is a radio frequency transmitter such that the hit signal transmitted therefrom comprises a radio frequency signal.

9. The target device according to claim 6 wherein the hub is arranged to associate a target device identification of a respective one of the target devices with each hit signal received from the target devices and transmit the target device identification with the hit signal.

10. The target device according to claim 1 wherein the sensor array comprises at least one reflective sensor supported on a carrier body, the carrier body being arranged to be supported on a user such that said at least one reflective sensor is oriented to capture light signal reflected off of the user.

11. A method of generating a hit signal using the target device in the weapons simulation system according to claim 1, the method including:

receiving the first portion of one activation code by a first one of the photodiodes;

receiving the at least one second portion of said one activation code by a different one of the photodiodes;

outputting the hit signal from the processor when the first portion and said at least one second portion correspond to an entirety the activation code received within the respective prescribed duration of the activation code.

\* \* \* \* \*